June 16, 1959 R. K. LITTLE 2,890,855
PINCH VALVE
Filed June 15, 1955
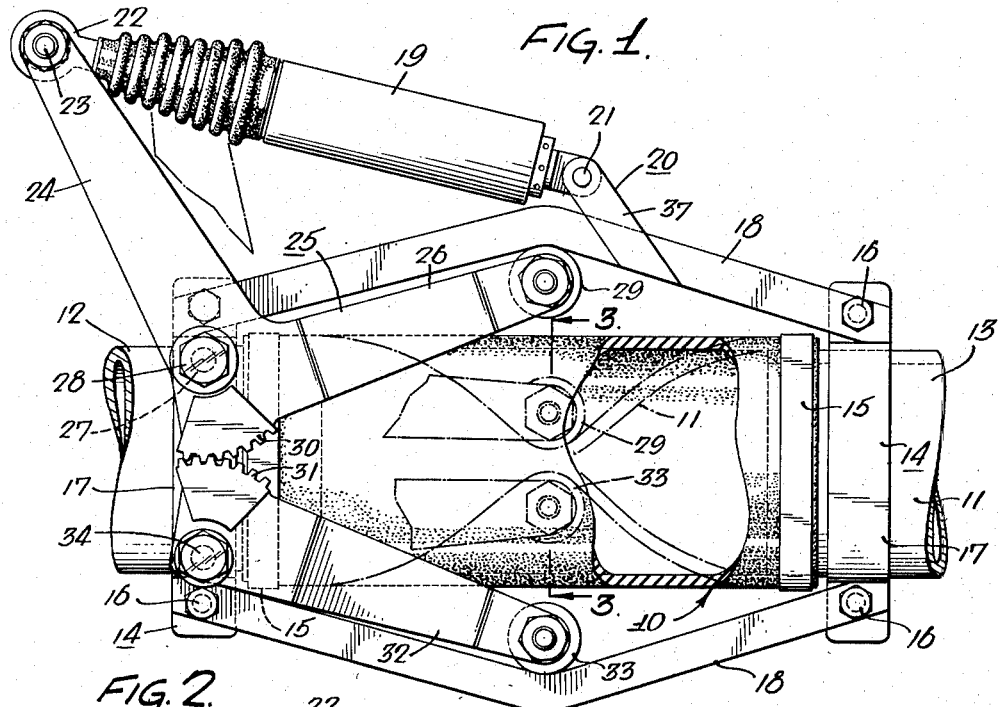
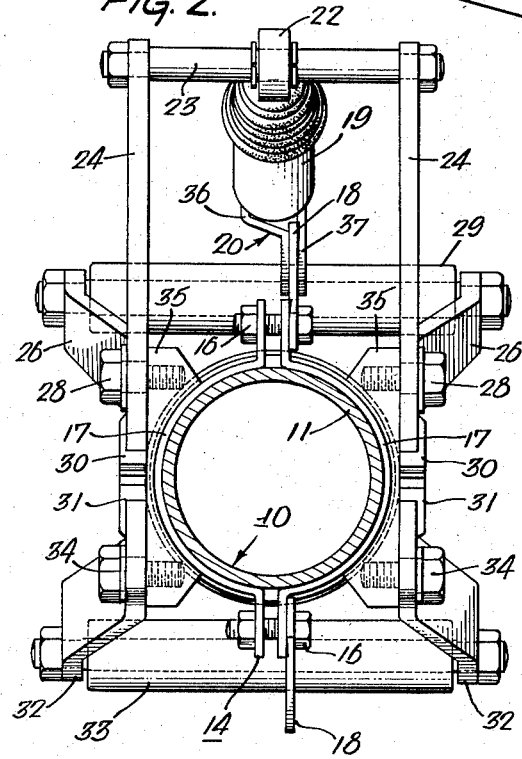
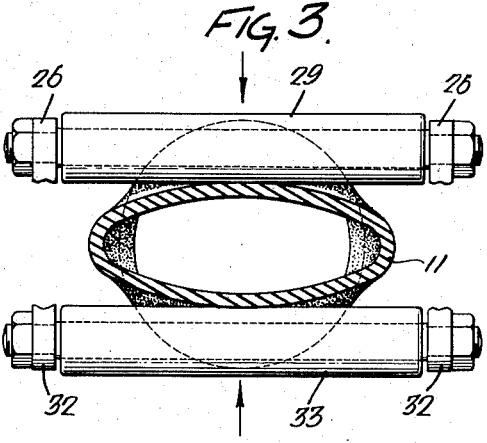
Inventor:
Robert K. Little
by Howson & Howson
Attys.

United States Patent Office 2,890,855
Patented June 16, 1959

2,890,855

PINCH VALVE

Robert K. Little, Philadelphia, Pa.

Application June 15, 1955, Serial No. 515,679

1 Claim. (Cl. 251—5)

This invention relates to valves of the pinch type, i.e., to valves in which a pair of opposed closure members or jaws are moved relatively toward and away from each other to compress a length of flexible tubing to closed position or release it to open position.

An object of this invention has been to provide such a valve in a form which is economical to manufacture and simple and reliable in its mounting in relation to the conduits which it controls and in its operation.

A further object has been to provide such a valve in a form in which the actuation is accomplished through an advantageous combination of fluid pressure and mechanical operating features.

A further object has been to guide and limit the movement of the closure members of such a valve by mounting and limit stop controlling members of very simple nature, which are secured in position to the same clamping members by which the valve structure is secured across the interconnected conduits.

A further object has been to provide a pinch valve in which the bars or closure members are actuated through levers to cause them to move in a direction which is virtually at right angles to the flexible tubing member, in pinching it to closed position.

Still further objects and advantages, and the manner in which they have been attained, will be evident from reading of the following detailed description in the light of the attached drawing in which, Figure 1 is a side elevation of the valve of the invention as applied to a pair of longitudinally spaced conduit sections which it interconnects, Figure 2 is an end view looking toward the left end of Figure 1, and Figure 3 is a combined cross-section and elevation, the section being on the line 3—3 of Figure 1.

By reference to the drawings, it will be seen that the valve 10 of the invention comprises a flexible and elastic tubing member 11 which in use is telescoped about opposing ends of conduit members 12 and 13, and opposed clamping members 14 designed to support the valve operating mechanism in operative relationship to the tubing member 11. The tubing 11 may be secured initially at its opposite ends around conduits 12 and 13 by conventional split ring clamps 15, and the opposed complemental parts of clamping members 14 thereafter secured to each other by screws or bolts 16 interconnecting these individual clamping jaws 17. These are complementally curved to clamp them securely to conduit members 12 and 13.

A pair of spacer bars 18 extend on opposite sides of the tubing through substantially its entire length, and serve to locate the actuating mechanism in relation to the tubing. They serve as mountings for parts of the actuating mechanism, and also as limit stop abutments for movement of the valve-closing members away from the closing position. These bars 18 are secured at their opposite ends to clamps 14, preferably through the same bolts 16 by which the clamping jaws 17 are secured to each other.

The fluid pressure motor 19 which provides the power for actuation of the valve may be mounted upon a bracket 20 comprising arms 36 and 37 secured to opposite sides of one of the spacer bars 18, and this motor is pivoted at one of its ends 21 to this bracket. The opposite end 22 of the motor, which is relatively movable in a longitudinal direction with respect to the end pivoted at 21, is pivotally secured to a transversely extending bar 23, which is secured to the upper ends of laterally spaced arms 24 of bell-crank levers 25, through which motion is imparted to the other ends 26 of the bell-cranks. The bell-cranks are secured at 27 by bolts 28 entered into lugs 35 on clamping jaws 17 for the desired pivotal movement under the impelling force of the fluid pressure motor 19, and the arms 26 of the bell-cranks 25 carry at their free ends a valve-closing pinch bar 29, this bar being in the form of a roller in the embodiment illlustrated.

Gear sectors 30 are carried by bell-cranks 25 substantially at their apices, and these gear sectors mesh with corresponding and complemental sectors 31 carried by the adjacent ends of actuating levers 32 which carry on their free ends the pinch bar or roller 33 which cooperates with bar 29 in closing the valve. Levers 32 are pivotally mounted at 34 to the lower ends of the clamping jaws 17 toward their lower ends in the same manner that bell-cranks 25 are secured toward the upper ends of these jaws.

The manner in which the valve operates may be understood from consideration of the open position illustrated in full lines in Figure 1, and of the closed position illustrated in broken lines in that figure. It will be seen that the spacer bars 18 serve as outer limit stops for the pinch bars or rollers 29 and 33 and their associated levers in the open position. When it is desired to close the valve, actuating fluid is introduced into the cylinder of fluid pressure motor 19 to cause movement of the levers 25 and 32 about their pivots to pinch the tubing by moving the pinch bars 29 and 33 from the full to the broken line positions of Figure 1. In Figure 3, these bars and the tubing are illustrated in a partially closed position.

From the foregoing discussion, it will be seen that the spacer bars 18 serve not only to mount the actuating mechanism in proper position relative to the tubing, but that they also serve as a mounting for the actuating cylinder. The securement of the pinch bars at the free ends of levers connected through gearing and actuated through force supplied by fluid pressure motor 19 against the arm 24 of bell-crank levers 25 also serves to move the two pinch bars in opposite directions substantially at right angles to the axis of the tubing.

While the invention has been described only in relation to a single specific embodiment, various modifications and refinements are available to those skilled in the art and I therefore wish to have it understood that this invention is not to be limited in interpretation except by the scope of the following claim.

I claim:

In a pinch type valve, the combination comprising a flexible tubing member and means for securing opposite ends of said tubing member in fluid-conducting relationship to opposed spaced ends of a pair of conduits to be interconnected thereby, a valve-actuating framework including a pair of structural members extending longitudinally in spaced relation from opposite sides of said tubing member and means to secure the opposite ends of said structural members to the opposed conduit sections adjacent the respective ends thereof, a pair of intermeshed gears rotatably mounted upon said framework with their axes located on opposite sides of the center line of said tubing member and transversely thereto, a bell crank lever secured for driven rotation by at least one of said gears and extending longitudinally of said tubing member, a pinch bar secured to a portion of one arm of said bell-crank lever spaced from its driving gear, a further arm secured for rotation with the other gear and extending longitudinally of said tubing member on the opposite side thereof from said first mentioned arm, and a pinch bar secured to a portion of said further arm spaced from its driving gear and lying in opposed relationship to the pinch bar upon said first mentioned arm at the opposite side of said tubing therefrom, said pinch bars extending transversely within the spaces between the outer circumference of the tubing member at opposite sides thereof and the inner surfaces of said respective structural members, the other arm of said bell crank lever serving for actuation of said intermeshing gears for moving said pinch bars simultaneously in opposite directions between open and closed position of said valve and the end of said other arm of said bell crank lever being pivotally connected to a reciprocating fluid pressure motor for actuation of said valve between open and closed position, said fluid pressure motor being secured to one of said structural members at an intermediate portion of the length thereof.

References Cited in the file of this patent

UNITED STATES PATENTS

| | | |
|---|---|---|
| 2,602,628 | Turenne | July 8, 1952 |
| 2,659,387 | Farris | Nov. 17, 1953 |
| 2,721,052 | Hull | Oct. 18, 1955 |

FOREIGN PATENTS

| | | |
|---|---|---|
| 643,904 | Great Britain | of 1950 |
| 973,168 | France | of 1951 |
| 1,017,647 | France | of 1952 |